United States Patent [19]

Björklund

[11] Patent Number: 4,519,615

[45] Date of Patent: May 28, 1985

[54] SHAFT SEAL DEVICE

[75] Inventor: Bengt Björklund, Handen, Sweden

[73] Assignee: AB Grindex, Handen, Sweden

[21] Appl. No.: 599,094

[22] Filed: Apr. 11, 1984

[51] Int. Cl.³ .............................................. F16J 15/34
[52] U.S. Cl. .................................................... 277/92
[58] Field of Search ........................ 277/81, 83, 92, 94

[56] References Cited

U.S. PATENT DOCUMENTS

| 3,447,810 | 6/1969 | Porter | 277/92 |
| 3,782,735 | 1/1974 | Novosad | 277/92 |
| 4,418,919 | 12/1983 | Wentworth | 277/92 |

Primary Examiner—Robert I. Smith
Attorney, Agent, or Firm—John T. O'Halloran; Peter R. Ruzek; Mary C. Werner

[57] ABSTRACT

A mechanical seal device includes a seal ring arranged non-rotatably in a cup which is locked against a shoulder on a shaft. The cup contains a ring of a flexible material which axially supports the seal ring. The flexible material ring is provided with a collar situated between the seal ring and the shaft, thus sealing the space and centering the seal ring on the shaft.

2 Claims, 1 Drawing Figure

U.S. Patent  May 28, 1985  4,519,615
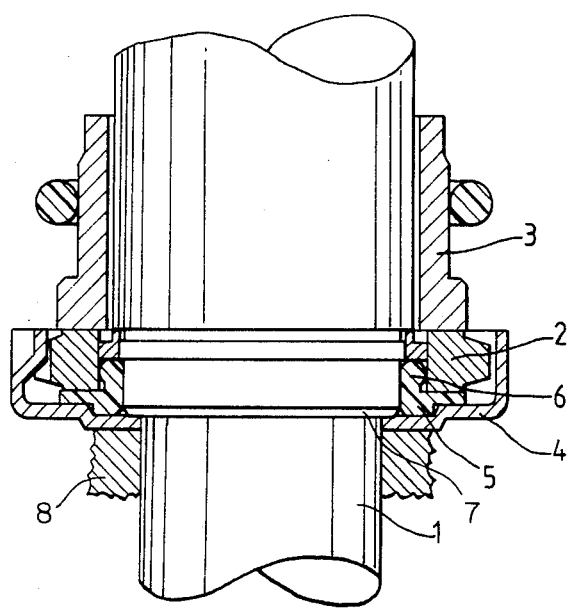

SHAFT SEAL DEVICE

This invention concerns a shaft seal device consisting of a rotatable and a non-rotatable seal ring which are pressed towards each other by a spring, a so-called mechanical seal.

These types of seal are used for several different types of machines containing rotating shafts, for instance submersible machines such as pumps and turbines.

A problem that arises with this type of seals is the connection of the rotating seal ring, that is, how this shall be fixed or locked to the rotating shaft. This problem has increased lately when the material in the seal rings has been replaced by hard metal and ceramics, which are expensive to machine and have great demands on flatness and exact mounting.

According to a known construction for submersible pumps, the rotating seal ring is pressed axially against a shoulder on the rotating shaft. This pressure is obtained by the pump impeller via a disc spring.

The rigid attachment between seal ring and shaft can however sometimes create a problem. Too big tolerances in shaft and spring may cause the seal ring to take an inclined position which of course impairs its sealing ability as well as its length of life.

According to the invention the problem of obtaining a perfect mounting of the rotating seal ring is solved by arranging it rotary proof in a cup which is pressed axially and locked to a shoulder on the sealed shaft. The cup surrounds a ring of a flexible material which axially supports the seal ring, the flexible ring being provided with an axial collar situated between the seal ring and the shaft, thus sealing this space and centering the seal ring on the shaft.

The invention is described more closely below with reference to the enclosed drawing.

In the drawing 1 stands for a rotatable shaft sealed by a mechanical seal comprising rotating and a non-rotating ring 2 and 3 respectively. 4 stands for a cup, 5 a flexible ring having a collar 6 and 7 stands for a shoulder on the shaft 1.

The rotating seal ring 2 is thus mounted within the cup 4 in such a way that it can not be turned relative to the cup 4. This is preferably obtained by a bulge in the cup which fits with a corresponding notch in the seal ring.

A ring 5 of a flexible material is arranged between the bottom of the cup 4 and the seal ring 2 for absorbing any irregularities in the surfaces. The ring 5 is also provided with an axially directed collar or bead 6 meant to take up the space between the shaft 1 and the inner surface of the seal ring. This collar will then seal this space and at the same time it centers the seal ring on the shaft similar to what a conventional O-ring does.

The cup 4 is in a usual way pressed against the shoulder 7 by help of an impeller 8 attached to the shaft and is then non-turnably locked to the shaft.

The non-rotatable seal ring 3 is attached to a non-rotatable part in the machine and is pressed axially by spring force against the rotating seal ring 2 in a usual manner.

According to the invention there is thus provided a simple attachment of the rotating ring in a mechanical seal device which ensures a correct mounting position and which is relatively non sensitive to tolerance variations in the components.

I claim:

1. A mechanical seal device for a rotating shaft comprising:
   stationary seal means mounted on the shaft;
   rotating seal means sealingly engaging said stationary seal means;
   a cup-shaped formation disposed in a predetermined axial position on the shaft and mounted for rotation therewith, said formation surrounding said rotating seal means and positively engaging the same for joint rotation therewith; and
   a flexible element positioned in said cup between the shaft and said rotatable seal means to axially and radially position said rotatable seal means.

2. The device as claimed in claim 1 for use with a shaft having an impeller mounted thereon further comprising means for holding said cup-shaped formation in said predetermined axial position, including a shoulder portion on the shaft which confines a portion of said cup-shaped formation between itself and the impeller.

* * * * *